(No Model.) 2 Sheets—Sheet 2.

H. BINSSE.
GEARING FOR LATHES.

No. 504,657. Patented Sept. 5, 1893.

WITNESSES:
Francis P. Reilly
W. F. Brinckel

INVENTOR
Henry Binsse
BY
R. M. Doorkus
ATTORNEY

UNITED STATES PATENT OFFICE.

HENRY BINSSE, OF NEWARK, NEW JERSEY.

GEARING FOR LATHES.

SPECIFICATION forming part of Letters Patent No. 504,657, dated September 5, 1893.

Application filed October 19, 1892. Serial No. 449,323. (No model.)

*To all whom it may concern:*

Be it known that I, HENRY BINSSE, of Newark, in the county of Essex and State of New Jersey, have invented new and useful Improvements in Gearing for Driving Machinery, which invention is fully set forth and illustrated in the following specification and accompanying drawings.

The object of this invention is to enlarge the scope, or range for work, of those classes of machines in which a wide range of speed of rotation is required, notably in such machines as lathes and boring, shaping and other cutting machines.

The invention will first be described in detail and then particularly set forth in the claims.

Figure 1:
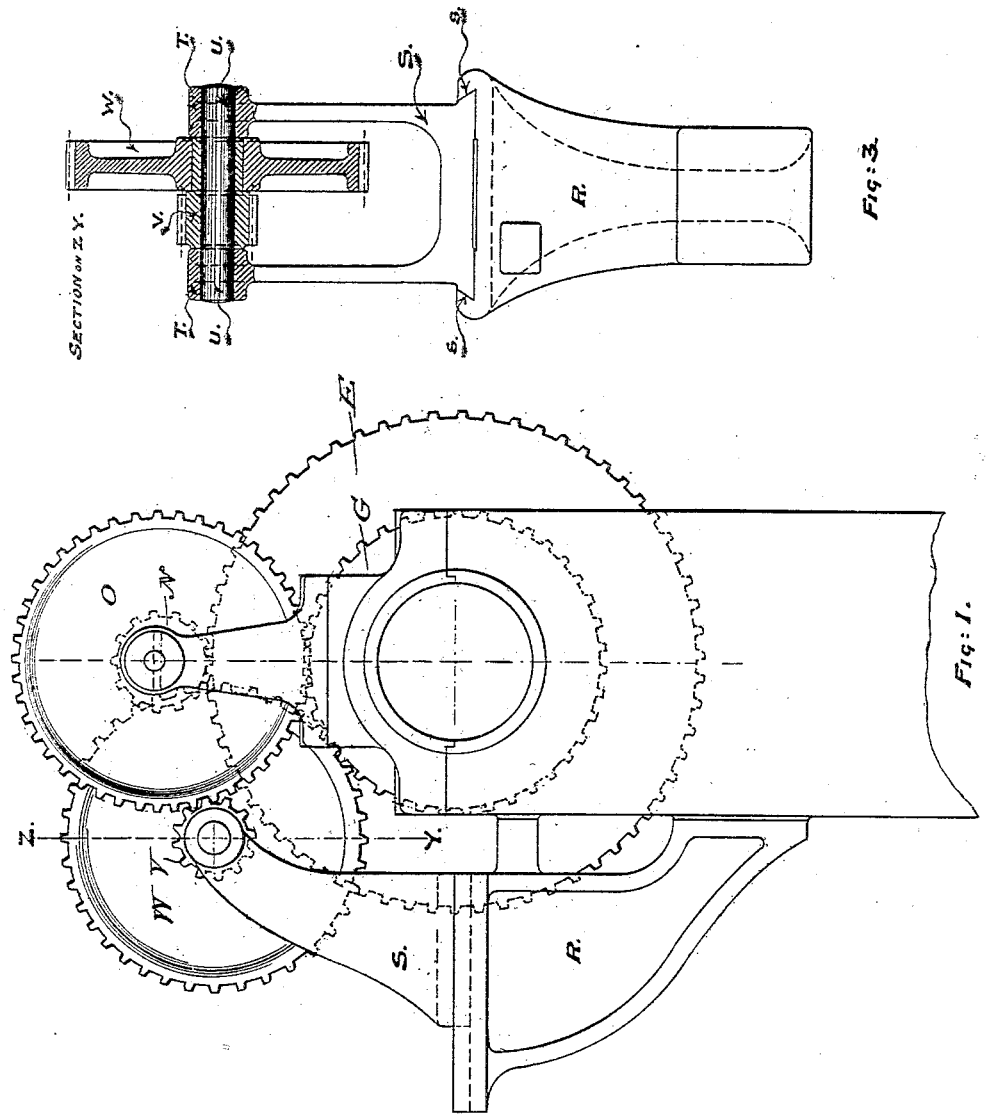
Figure 2:
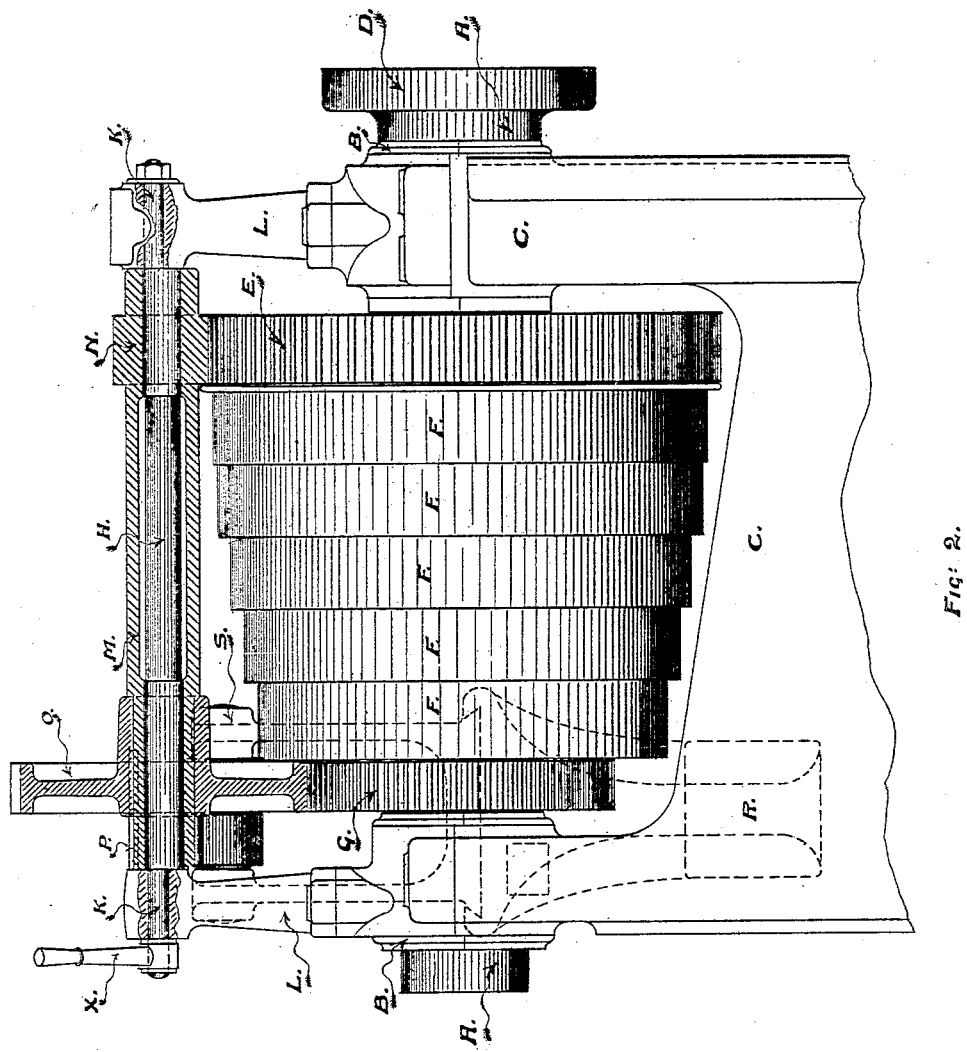

In the accompanying drawings, Figure 1, shows in end elevation, a lathe or boring mill, fitted with my improvement, the bed plate or base of the machine being broken away. Fig. 2, shows the machine in side elevation, above its bed plate, the back-gear being shown in longitudinal vertical section. Fig. 3, shows the gearing of my improvement in longitudinal vertical section, detached from the machine, with its supporting frame for securing it to the machine.

In said figures the several parts are indicated by reference letters by which said parts will be distinguished as now to be described.

The letter A indicates the spindle of a lathe or boring mill, mounted in bearings B, B, on the frame C, C. The spindle A is provided with a face-plate D, as shown in Fig. 2. A boring bar may be passed through said face-plate by securing the same in any well known manner, to or in the spindle A, which may be made hollow as is commonly the case. On said spindle is mounted in the usual manner, the gear wheel or spindle gear E, secured thereto by key or otherwise, to drive the spindle when said gear rotates. Loosely mounted on said spindle are also the pulleys F, five in number, and their pinion or gear wheel G, secured to said pulleys to revolve with them. Said pulleys may be as numerous as desired, or as usually constructed a single "cone pulley" of a series of differential diameters, may be employed. Said pulley or pulleys and the gear wheel G, are secured together to revolve on the spindle A, when driven by a belt on any one of the differential diameters F. It is obvious that, if desired, the gear-wheel E may be loosely mounted on the spindle A and secured to the pulley F, the gear-wheel G in such case being keyed to said spindle.

The back gear shaft H, is provided with eccentric journals in bearings K on standards or pillow-blocks L, secured to the main bearings of the spindle of the machine. On said shaft H, is a sleeve M provided, near one end, with a pinion N which meshes with the gear wheel E. Near its other end said shaft is provided with a gear wheel O, which is fitted to slide on a feather P, on said sleeve, so as to revolve with it.

Secured to the frame of the machine is a casting or web piece R, and mounted on said casting is a bracket S, fitted to slide thereon, preferably in a dovetail as seen at s, Fig. 3. Said bracket may be clamped, in the desired position, to the casting R, by set screws (not shown) or otherwise as preferred.

Mounted in bearings T in the bracket S, is a shaft or coutershaft U, having keyed or otherwise secured thereon the pinion V and gear wheel W.

With the parts thus constructed and connected the effect of my impovement upon the operation of the machine will now be described.

In Fig. 2, my improvement is shown thrown out of gear, so that the spindle A of the machine is driven by the pinion N and gear E, the pinion N taking its motion from the gear O, driven by the gear G. This multiple of gearing being fixed, the speed of the spindle A, can only be varied to the extent of the change of diameters in shifting the driving belt (not shown) from one step to the others of the cone-pulley F. Unless therefore said steps be very numerous, the difference in speed of spindle is confined to comparatively narrow limits.

In order to bring my improvement into operation, the gear O is slid along the sleeve M, until out of mesh or gear with the gear G. The bracket S is then slid in toward the sleeve M until the pinion V is in mesh with the gear wheel O, and the gear wheel W, is in mesh with the driving gear G on the spindle A. It can now be readily seen that, as thus geared, five additional different speeds are obtained by shifting the belt from step to step of the cone-pulley F, and by providing several sets of gears, V, W, of different multiples of gearing, and substituting one set for another, which can be done in a very few moments of time, the variation in speed of spindle A, and hence of face-plate or boring bar, can be almost infinitely varied.

It is preferable with my improvement to set the "back gear" proper, vertically, or nearly so, over the spindle. The mounting of the back gear shaft H in eccentric bearings is a well known expedient for throwing the back gear entirely out of service. By turning the handle x, the shaft H can be rotated so as to throw the gears on said shaft entirely out of mesh with the gears on the spindle A of the machine. This feature forms no part of my invention.

Having thus fully described my invention, I claim—

1. In a train of driving gearing, in combination with a slidable gear on a back-gear shaft, a gear and pinion mounted on an adjustable countershaft, so that said slidable gear may be thrown in mesh with said pinion and the gear on the countershaft may mesh with a gear on the spindle of the machine, substantially as set forth.

2. In a train of driving gearing, the combination of a cone-pulley; a pinion or gear-wheel and a spindle-gear mounted on said pulley's spindle; back-gears; and a pair of gears mounted on a shaft carried by the arms of a removable bracket, said bracket being adjustably secured to the frame of the machine; whereby the speed of said pulley's spindle may be varied within large limits, substantially as and for the purposes set forth.

3. In a train of driving gearing, the combination of the following named elements: a spindle, as A; a spindle-gear, as E, secured to said spindle; a cone-pulley, as F, loosely mounted on said spindle; a gear-wheel, as G, secured to said cone-pulley; back-gears, as N. O; a bracket, as S, adjustably secured to the frame of the machine; a shaft, as U, carried in arms of said bracket; and a pinion, as V, and gear-wheel, as W, secured to said shaft; substantially as and for the purposes set forth.

HENRY BINSSE.

Witnesses:
FRANCIS P. REILEY,
THEO. H. FRIEND.